No. 744,751. PATENTED NOV. 24, 1903.
T. GRIFFIN.
PLOW.
APPLICATION FILED JUNE 7, 1902.
NO MODEL.
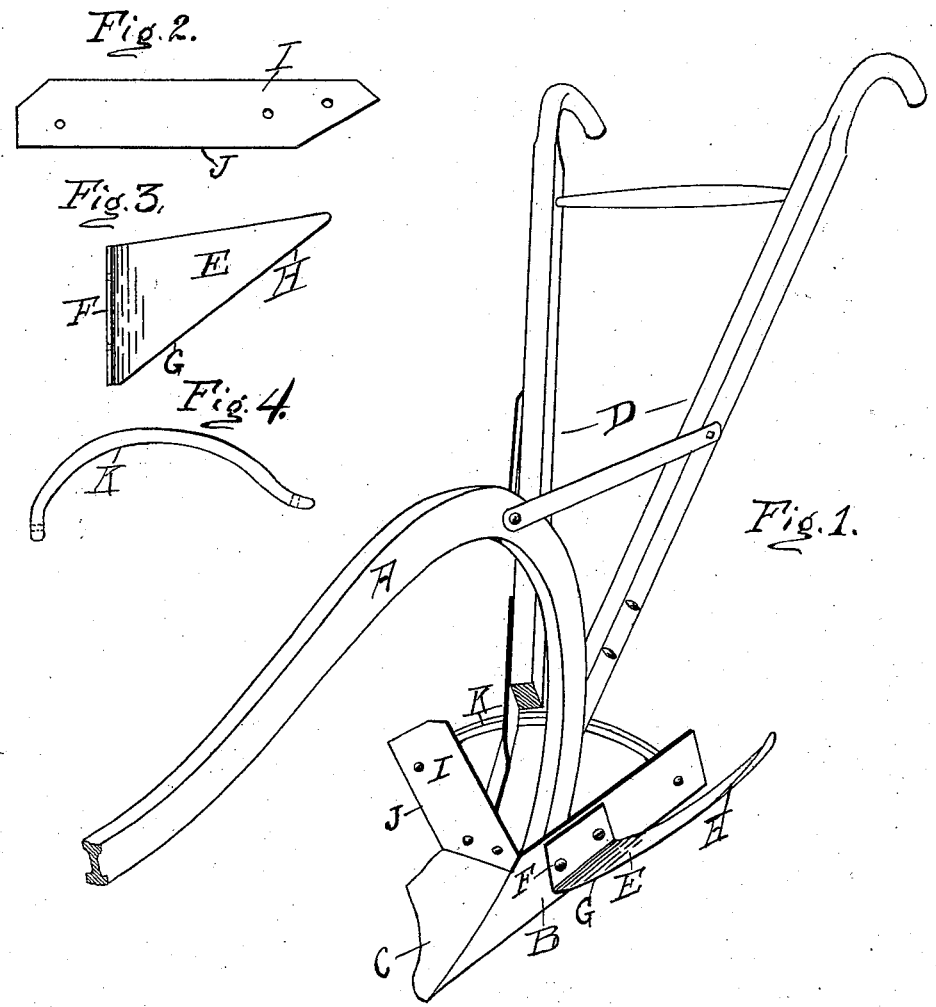
Witnesses.
Inventor.
Tom Griffin No. 744,751. Patented November 24, 1903.

UNITED STATES PATENT OFFICE.

TOM GRIFFIN, OF GURLEY, TEXAS, ASSIGNOR OF ONE-HALF TO LOUIS HOWELL, OF PERRY FALLS, TEXAS.

PLOW.

SPECIFICATION forming part of Letters Patent No. 744,751, dated November 24, 1903.

Application filed June 7, 1902. Serial No. 110,700. (No model.)

*To all whom it may concern:*

Be it known that I, TOM GRIFFIN, a citizen of the United States, residing at Gurley, in the county of Falls and State of Texas, have invented certain new and useful Improvements in Plows, of which the following is a specification.

My invention relates to cultivator-plows, and has for its object to provide a plow for cultivating cotton, corn, potatoes, &c., that are planted in rows, and is designed to shape the sides of the beds and at the same time cut out grass and weeds that may be growing between the rows and on the sides of the beds.

The advantages of my invention will fully appear hereinafter and by reference to the accompanying drawings, in which—

Figure 1 is a view in perspective of my improved plow; Figs. 2 and 3, detail views of the cutting-plates, and Fig. 4 a view of the arch-shaped brace.

Referring to the drawings, in which similar reference characters indicate corresponding parts throughout the several views, A represents a plow-beam, of any desired construction, to which is secured a plate B, corresponding in construction to the landside of a turning-plow.

C represents the plowshare, which is suitably secured in front of the plate B, and D represents the handles, of ordinary construction.

The parts A, B, C, and D are the ordinary construction of plow and do not form any part of my invention except to support the parts hereinafter described.

E represents a cutting-plate having a flange F, secured to plate B, and a cutting edge G, extended laterally from said plate B a little above the lower edge thereof and gradually extending upwardly for about half its length and then bent more sharply, as shown at H. The front of plate E is formed with a sharp edge that slants backward from the front of the plow. The plate E is intended to pass an inch or two beneath the surface of the earth to cut out the roots of any grass or weeds that may be growing on the side hill of the row of growing cotton or other plants. On the other side of the plow I secure a plate I above share C and extended backward behind said share C and provided with a cutting edge J, formed on its lower edge, that is adapted to pass along the surface or directly beneath it to cut down weeds or grass growing between the rows. The rear end of plate I is braced by means of arch-shaped bar K.

Having thus described my invention, what I claim is—

1. In a plow, a plate I secured to the front thereof above the share and extending backward having its lower edge formed with a sharpened cutting edge, substantially as shown and described.

2. In a plow, in combination with the share and a landside plate, a plate secured to the landside plate extending laterally therefrom and having a cutting edge that slants backwardly from the front of the plow, said plate being bent upward gradually for a part of its length and then sharply for the balance, and a plate secured above the plowshare and extending backward therefrom having a sharp cutting edge, substantially as shown and described.

In testimony whereof I have signed my name to this specification in the presence of two subscribing witnesses.

TOM GRIFFIN.

Witnesses:
Z. W. BARTLETT,
W. J. FINKS.